United States Patent [19]

Haupt

[11] Patent Number: 5,236,061
[45] Date of Patent: Aug. 17, 1993

[54] ARRANGEMENT OF A STEERABLE RIGID AXLE ON A TRACTOR CHASSIS

[75] Inventor: Josef Haupt, Tettnang, Fed. Rep. of Germany

[73] Assignee: Zahnradfabrik Friedrichshafen AG, Friedrichshafen, Fed. Rep. of Germany

[21] Appl. No.: 689,269

[22] PCT Filed: Nov. 15, 1989

[86] PCT No.: PCT/EP89/01368
§ 371 Date: May 22, 1991
§ 102(e) Date: May 22, 1991

[87] PCT Pub. No.: WO90/06242
PCT Pub. Date: Jun. 14, 1990

[30] Foreign Application Priority Data

Nov. 25, 1988 [DE] Fed. Rep. of Germany ....... 3839821

[51] Int. Cl.⁵ .................... B60K 5/02; B60K 17/24
[52] U.S. Cl. ................... 180/254; 180/55; 180/69.1; 180/374; 180/381
[58] Field of Search ............. 180/252, 265, 266, 69.1, 180/339, 348, 353, 358, 374, 376, 378, 379, 380, 381, 382, 254, 55, 299

[56] References Cited

U.S. PATENT DOCUMENTS

| 1,885,427 | 11/1932 | Gabli | 180/254 |
| 3,213,958 | 10/1965 | Muller | 180/254 |
| 4,506,756 | 3/1985 | Bergous | 180/69.1 |
| 4,709,778 | 12/1987 | von Sivers | 180/69.1 |
| 4,804,056 | 2/1989 | Toshikuni et al. | 180/339 |
| 5,065,831 | 11/1991 | Murakami | 180/55 |

FOREIGN PATENT DOCUMENTS

| 0907254 | 3/1954 | Fed. Rep. of Germany . |
| 3834693 | 6/1989 | Fed. Rep. of Germany . |
| 0803574 | 7/1936 | France . |
| 2596709 | 10/1987 | France . |

OTHER PUBLICATIONS

"Technisches Konzept Mercedes-Benz Allradschlepper MK6703. 3561. 00–00/0287" Feb. 28, 1987, Daimler-Benz AG, Stuttgart-Unterturkheim Siele Seite 7.

Primary Examiner—Margaret A. Focarino
Assistant Examiner—A. M. Boehler
Attorney, Agent, or Firm—Herbert Dubno

[57] ABSTRACT

In an arrangement of a steerable rigid axle on a chassis of a tractor of modular construction, the rigid axle is spring-mounted with respect to the tractor chassis and is supported on its rear side via a propeller shaft tube swingable in a support bearing block on the side of the chassis, the arrangement includes an oil sump provided with a tunnel-like recess a support bearing block partially made in one piece with the oil sump.

7 Claims, 3 Drawing Sheets

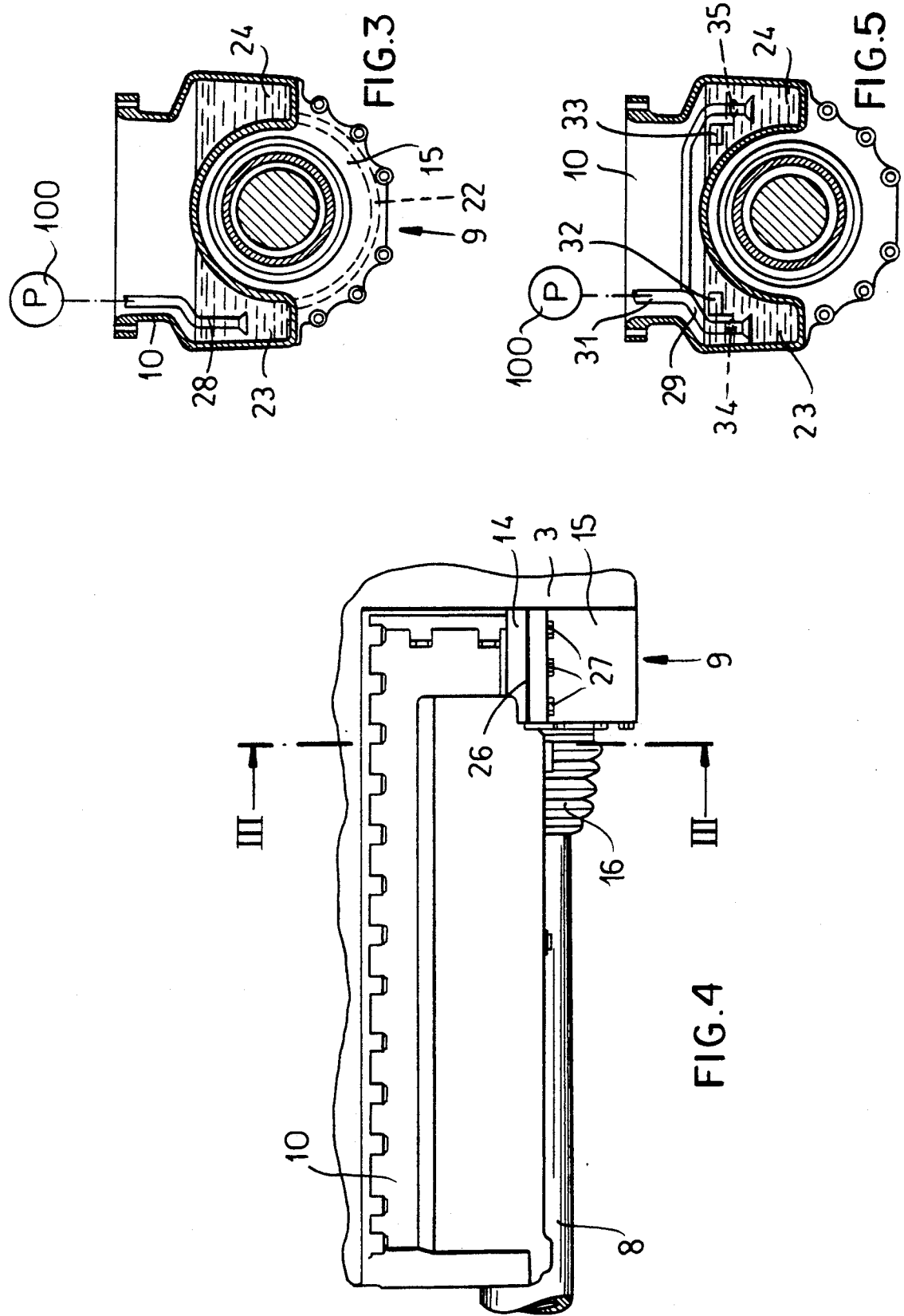

ARRANGEMENT OF A STEERABLE RIGID AXLE ON A TRACTOR CHASSIS

CROSS REFERENCE TO RELATED APPLICATIONS

This is a National Phase Application of PCT/EP89/01368 filed 15 Nov. 1989 and based, in turn, upon German national application P 38 39 821.4 filed 25 Nov. 1988.

FIELD OF THE INVENTION

The invention relates to a steerable rigid axle on a chassis of a tractor, whereby the chassis is of modular construction at least in the areas of its construction units—engine, flywheel housing and transmission—and is spring-mounted with respect to the rigid axle. The assembly has a propeller shaft tube arranged in the region of the transverse median plane of the rigid axle acts upon the latter with one end, the other end of the propeller shaft tube being mounted to rotate freely in a support bearing block of the chassis by means of the spherical part of a universal joint.

BACKGROUND OF THE INVENTION

An arrangement of the above-mentioned kind for a steerable rigid axle on a tractor is the subject of a previous patent document D.E. 38 34 693. The rigid axle arranged in front of the engine is centrally swingably suspended in a transverse wheel fork, which together with a combined spring and damper element takes care of the suspension of the rigid axle. In one variant, the propeller shaft acting upon the rear side of the rigid axle runs centrally under the engine, which in this modular construction is connected with the flywheel housing and the transmission. In such a standard construction of the tractor using a spring-mounted rigid axle with propeller shaft, problems arise with respect to the construction of the engine oil sump, since the shaft limits considerably the space required for the oil sump. In a further variant, in order to avoid this problem a forked propeller shaft whose sides can laterally bypass the oil sump is used. The side parts running next to the oil sump reduce thereby the free space for the maximum excursion of the steering angle of the wheel which at that time is on the inside of the curve.

From the prospectus entitled "Technisches Konzept, Mercedes-Benz-Allradschlepper" MK 6703.3561.00-00/0287 a tractor with modular construction is known, whose propeller shaft acting upon the rigid axle is eccentrically arranged to bypass the engine oil sump and is supported on a power-drive transmission housing. Such a concept is not suitable for tractors of standard construction, wherein the construction units are connected to each other in a modular design.

OBJECTS OF THE INVENTION

It is the object of the present invention to arrange the propeller shaft tube of the rigid axle so that the ground clearance and the maximum excursion of the steering angle remain unimpaired. It is another object to support of the propeller shaft tube on the chassis side without essential modifications of the tractor's construction.

SUMMARY OF THE INVENTION

This task is achieved by passing the propeller shaft tube through a tunnel-like recess of the engine oil sump and by providing a support bearing block on the oil sump in the area of its screwed connection with the flywheel housing. At least a segment of the housing is formed as an integral part of the oil sump.

By using a rigid axle with propeller shaft tube, only the construction of the engine oil sump has to be modified. Since the propeller shaft tube is arranged within the tunnel-like recess, on the one hand the ground clearance of the vehicle is preserved and on the other hand, the centrally running shaft tube does not impair the steerability of the vehicle.

If within the same production series tractors have to be equipped with or without spring-mounted steering axles, according to the invention for the spring-equipped version it is merely necessary to provide a variant of the oil sump with tunnel-like recess and support bearing block. In the area where it is connected to the flywheel housing, the oil sump can be readily reinforced to give it enough rigidity for receiving the support bearing block of the propeller shaft tube.

In order to implement the structure the bearing support block should have a median horizontal jointing plane, whereby the upper-half bearing-box holder is an integral part of the oil sump and can be joined by screwing with a lower-half bearing-box holder. In both bearing-box halves, the spherical part of the universal joint runs over halves of a bearing box. This way, assembly and disassembly of universal joint for repairs is simple.

It was also designed that the holders for the bearing-box halves should have together with the oil sump a plane connection surface for the flanging of the flywheel housing. Due to the connection between the lower-half bearing-box holder with the upper-half bearing-box holder as well as with the flywheel housing a generally rigid connection between oil sum and flywheel housing results in this area.

Further, the lower-half bearing-box holder should have a radial lubricating-oil channel, connected with the inside of the two oil-sump sections extending on the sides of the propeller shaft tube. This lubricating-oil channel provides a connection between the two sections of the oil sump, so that the oil level is always balanced and a single lubricating-oil pump of the engine can aspire lubricating oil from both sections of the oil sump through a suction pipe.

It is also possible to eliminate such a lubricating-oil channel and to provide instead the lubricating-oil pump with two suction pipes, each of them individually aspiring lubricating oil from the respective section of the oil sump, controlled by a float. By means of the floats, the suction cross section of the suction pipes is controlled, so that air aspiration by the lubricating-oil pump is prevented when the oil in one of the oil sump sections has fallen below a minimal level.

Finally, in a tractor whose cardan shaft is arranged inside the propeller shaft tube, an output shaft driving the cardan shaft is supported in a bearing bracket made in one piece with the flywheel housing. This bearing bracket which is dimensioned correspondingly to the radius of the flywheel housing, has thereby a large bolting surface for the lower-half bearing-box holder.

BRIEF DESCRIPTION OF THE DRAWING

The above and other objects, features and advantages of my invention will become more readily apparent from the following description, reference being made to the accompanying highly diagrammatic drawing in which:

FIG. 3 is a cross-sectional view along line III—III in FIG. 4;

FIG. 4 is a lateral view of the arrangement of FIG. 2 in the area of the oil sump and the support bearing block;

FIG. 5 is a cross-sectional view of a variant of the oil sump with lubricating oil along lines III—III in FIG. 4.

SPECIFIC DESCRIPTION

Figure 1:
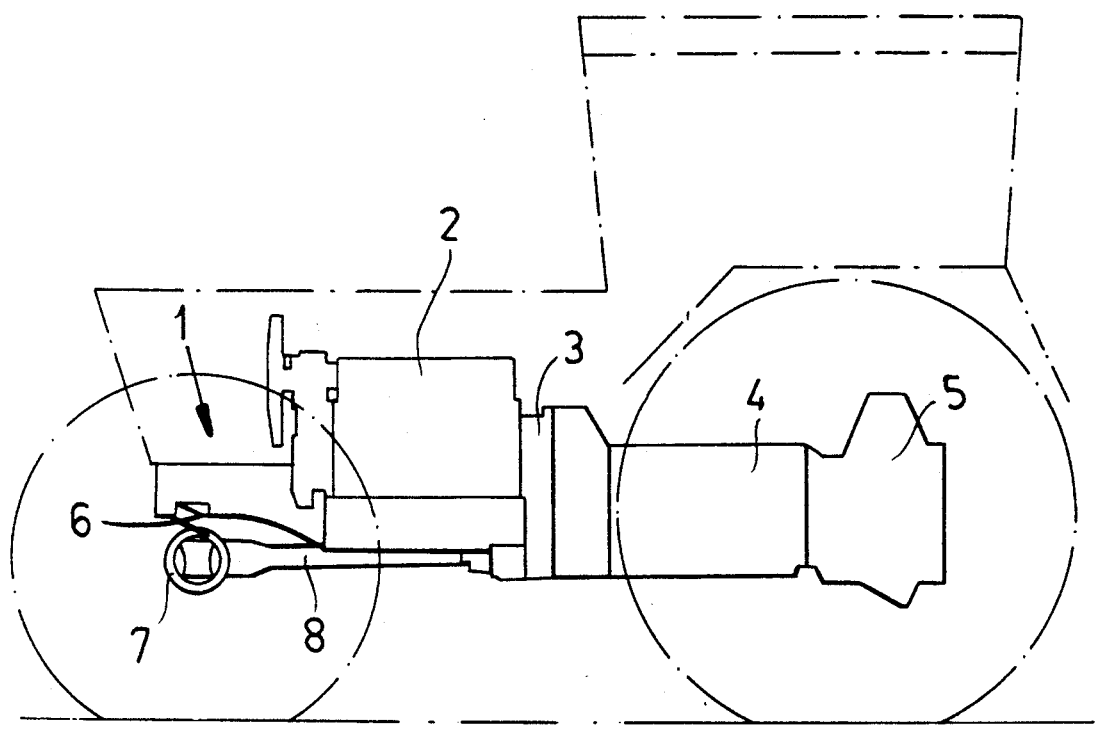
FIG. 1 is a lateral diagrammatic view of a tractor, wherein the construction units are connected in a modular design.

In FIG. 1 a tractor is shown wherein construction units—the front-axle bearing block 1, the engine 2, the flywheel housing 3, the transmission 4 and the rear-axle housing 5—are fastened to each other in a modular design. The front-axle bearing block 1 receives via suspension 6 a rigid axle 7 which is connected to a propeller shaft tube 8 at its rear side. This propeller shaft tube 8 is freely swingably guided in a support bearing block 9 which is mounted on an oil sump 10 of the engine 2. Thereby, the propeller shaft tube 8 serves for the reinforcement of the rigid axle 7 against the action of longitudinal forces.

Figure 2:
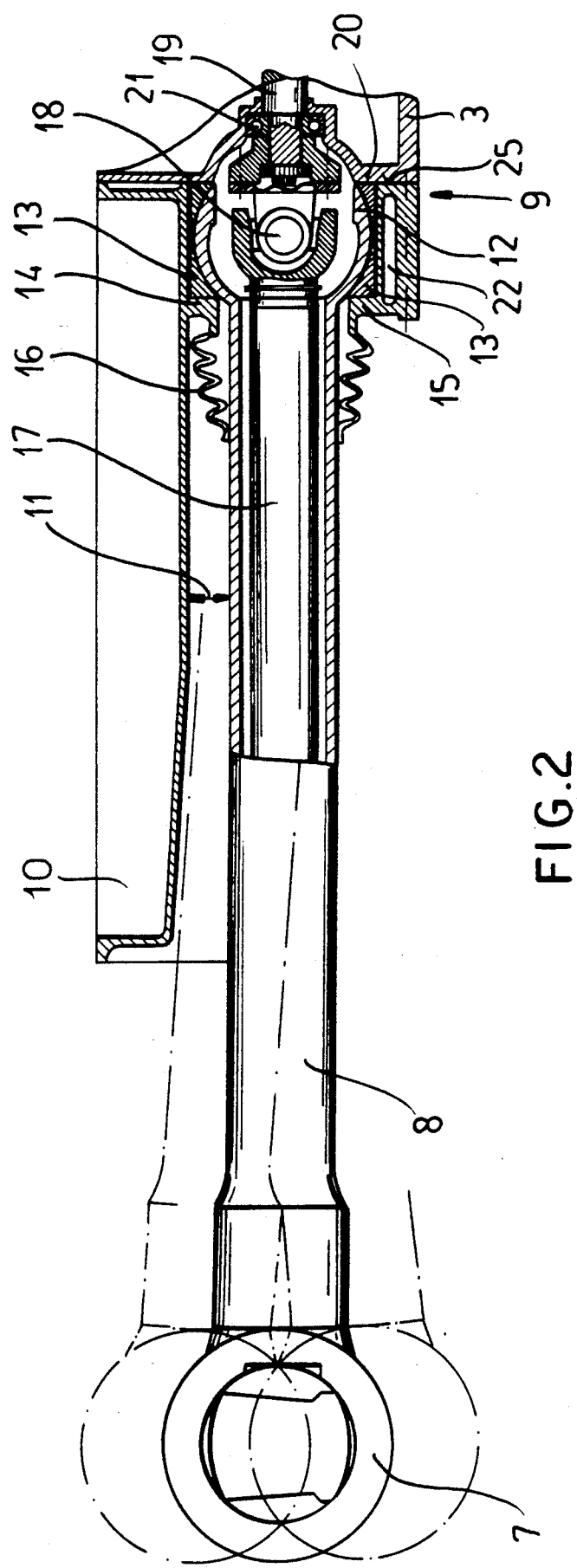
FIG. 2 is a partial longitudinal sectional view through an arrangement of a propeller shaft tube in a support bearing block which is part of an oil sump of an engine.

FIGS. 2, 3 and 4 show the path followed by the propeller shaft tube 8 and the way it is supported in the support bearing block 9. The propeller shaft tube 8 runs through a tunnel-like recess 11 of the oil sump 10 and has a universal-joint sphere 12 at its end. This universal-joint sphere 12 runs over upper-and lower bearing-box halves 13 in an upper-half bearing-box holder 14 and a lower-half bearing-box holder 15, whereby the upper-half bearing-box holder 14 is made in one piece with the oil sump 10 and is screwed to the lower-half bearing-box holder 15. By means of bellows 16 the penetration of dirt into the support bearing block 9 is prevented. Inside the propeller shaft tube 8, a propeller shaft 17 driving the steerable rigid axle 7 is arranged. For this purpose the propeller shaft 17 is connected via the universal-joint drive shaft 18 with the output shaft 19, which runs further through the flywheel housing 3 and into the transmission 4 shown in FIG. 1. The bearing bracket 20, which is a part of the flywheel housing 3 receives the output shaft 19 via a ball bearing 21. The bearing-box half holder 15 has a radial lubricating-oil channel 22, which connects the inside of the oil-sump sections 23 and 24 formed as a result of the tunnel-like recess 11 (FIG. 3). Further, from FIG. 2 can be seen that the two holders 14 and 15 for the bearing-box halves form together with the oil sump 10 a vertical connection surface 25 for the flanging of the flywheel housing 3. Further, from FIG. 4 it can be seen that the lower-half bearing-box holder 15 has a jointing plane with the upper-half bearing-box holder 14 and that it is fastened thereto by screws 27. From the oil-sump section 23, lubricating oil for the lubrication of engine 2 is aspirated by an oil pump 100, through the suction pipe 28.

In the arrangement shown in FIGS. 2 to 4, according to the invention the upper-half bearing-box holder 14 is produced as a casting together with the oil sump 10, thereby being an endpart of the tunnel like recess 11. The tunnel-shaped recess 11 allows the swinging motions of the propeller shaft tube around the spherical part 12 of its universal joint, which are required by the maximal stroke of the springs of the rigid axle 7. The lower-half bearing-box holder 15 is screwed together with the upper-half bearing-box holder 14, so that the propeller shaft tube 8 can be dismounted. As a result of the fact that the upper-half bearing-box holder 14 is an integral part of the oil sump 10 which is screwed to the flywheel housing 3, a particularly firm construction of the support bearing block 9 results. The lubricating-oil channel 22 is directly integrated in the lower-half bearing-box holder 15, so that with little manufacturing effort it is possible to achieve a balance of the oil level in both oil-sump sections 23 and 24.

As a result of its reduced height requirements, the single-component design of the upper-half bearing-box holder 14 with the oil sump 10 makes possible the presence of differential shafts in the oil sump 10, which are necessary in four-cylinder engines.

FIG. 5 shows a section through the oil sump 10 and the propeller shaft tube 8, basically similar to the illustration of FIG. 4, wherein in each of the two oil-sump sections a suction pipe 29, respectively 30, is provided. The two suction pipes 29 and 30 end in an aspiration duct 31 of a lubricating-oil pump. Floats 32 and 33 are arranged in the oil sump 10, laterally with respect to the suction pipes 29 and 30 loading to a pump 100, the vertical movements of these floats triggering valves 34 and 35. When the oil falls below a certain level in one of the oil-sump sections 23 or 24, these valves 34 and 35 controlled by the respective float 32 or 33 close the corresponding suction pipe 29 or 30 so that the lubrication-oil pump does not aspirate air.

I claim:

1. A tractor drive unit, comprising:
   an engine formed with an oil sump;
   a flywheel housing screwed to said oil sump;
   a transmission formed with a transmission shaft mounted rotatably about an axis on said flywheel housing, said engine, transmission and flywheel housing forming a drive modular unit;
   a front steerable rigid axle lying in a plane extending transversely to said axis;
   means for spring-mounting said modular unit with respect to said front rigid axle;
   at least one propeller shaft tube formed with a front end operatively connected with said axle shaft and with a rear end; and
   bearing means formed with a spherical seat pivotally supporting the rear end of said propeller tube, said oil sump being formed with:
   an axially extending tunnel receiving the rear end and extending over a substantial part of a length of said propeller shaft tube, and
   a bearing holder extending axially forwardly from said flywheel housing and spaced radially from said rear end of said propeller tube, said bearing means being mounted on said bearing holder, said bearing holder being formed at least partially unitarily with said oil sump.

2. A tractor drive modulator unit, comprising:
   an engine formed with an oil sump;
   a flywheel housing screwed to said engine;
   a transmission formed with a transmission shaft mounted rotatably about an axis on said flywheel housing, said engine, transmission and flywheel housing forming a drive modular unit;
   a front steerable rigid axle lying in a plane extending transversely to said axis;

means for spring-mounting said modular unit with respect to said front rigid axle;

at least one elongated propeller shaft tube formed with a front end operatively connected with said axle shaft and with a rear end;

bearing means for supporting the rear end of said propeller shaft tube, said oil sump being formed with an axially extending tunnel receiving the rear end of said propeller shaft tube, said bearing means being mounted on said oil sump and formed with:

a spherical seat rotatably supporting said rear end, a bearing holder spaced axially rearwardly from said front end of the propeller tube and surrounding said seat, said holder having a median horizontal joint plane and upper-half and lower-half bearing-box holders, said upper-half bearing-box holder being formed unitarily with said oil sump, and screw fastening means for connecting said halves together in said joint plane.

3. The tractor drive defined in claim 2 wherein said bearing holder halves and said oil sump have together a common connection surface extending radially outwardly from said axis and connected with said flywheel housing by said screwing means.

4. The tractor drive defined in claim 2 wherein said lower half holder is formed with an arcuate lubricating-oil channel, said oil sump being provided with two longitudinal trough sections for a lubricating oil extending along said propeller shaft tube and having respective bottoms spaced radially from one another, said arcuate channel being connected with and bridging said bottoms.

5. The tractor drive defined in claim 4, further comprising pump means for aspirating the lubricating oil from said oil pump, said pump means comprising:

a pump, at least one pipe connecting said pump with one of said trough sections, and a plurality of float valves closing off said pipe upon lowering a level of the oil in said sump below a predetermined one.

6. The tractor drive defined in claim 5 wherein said pump means includes two pipes, each of said pipes being connected with a respective one of said trough sections and being provided with a respective one of said float valves.

7. A tractor drive modular unit, comprising:

an engine formed with an oil sump;

a flywheel housing operatively connected with said engine, said flywheel housing being formed unitarily with a bearing bracket;

a transmission formed with a transmission shaft mounted rotatably about an axis on said bearing bracket, said engine, transmission and flywheel housing forming a drive modular unit;

a front steerable rigid axle shaft lying in a plane extending transversely to said axis;

means for spring-mounting said modular unit with respect to said front rigid axle;

at least one elongated propeller shaft tube formed with a front end operatively connected with said axle shaft and with a rear end;

a propeller shaft mounted in said propeller shaft tube to drive rotatably said rigid axle and driven by said transmission shaft; and bearing means for supporting the rear end of said propeller tube and formed with a spherical seat rotatably supporting said rear end, said oil pump being formed with:

an axially extending tunnel receiving the rear end of said propeller shaft tube, and a bearing holder extending axially forwardly from said flywheel housing and formed at least partially unitarily with said oil sump and receiving said spherical seat.

* * * * *